United States Patent [19]

Ramirez

[11] 4,222,872

[45] Sep. 16, 1980

[54] RECLAMATION OF MOLYBDENUM OR OTHER HEAVY METALS FROM WASTEWATER TREATMENT SKIMMINGS

[75] Inventor: Ernest R. Ramirez, Far Hills, N.J.

[73] Assignee: Dravo Corporation, Pittsburgh, Pa.

[21] Appl. No.: 15,664

[22] Filed: Feb. 27, 1979

[51] Int. Cl.² ............................ C02B 1/20; C02C 3/00
[52] U.S. Cl. .................................... 423/57; 210/688; 423/58; 423/87; 423/150; 423/146
[58] Field of Search ................. 75/109; 210/42 R, 43, 210/44, 45, 47, 49, 51, 56, 66, 67; 423/53, 55, 57, 58, 61, 87, 146, 150

[56] References Cited

U.S. PATENT DOCUMENTS

| | | | |
|---|---|---|---|
| 1,250,063 | 12/1917 | Westling et al. | 423/58 |
| 3,268,443 | 8/1966 | Cann | 210/47 |
| 3,347,786 | 10/1967 | Baer et al. | 210/45 |
| 3,575,853 | 4/1971 | Gaughan et al. | 210/50 |
| 3,725,266 | 4/1973 | Haviland | 210/45 |
| 4,036,941 | 7/1977 | Boyles et al. | 423/150 |

OTHER PUBLICATIONS

Giannini et al., "Removal of Heavy Metals From Mining Tailings Wastewater By Electrocoagulation", presented at 3rd Annual Conference, New Advances in Liquid–Solid Separation, Separ/Expo III at Cherry Hill, N.J., Oct. 12, 1977.

*Primary Examiner*—Charles N. Hart
*Assistant Examiner*—Peter A. Hruskoei
*Attorney, Agent, or Firm*—Parmelee, Miller, Welsh & Kratz

[57] ABSTRACT

Molybdenum or other heavy metal anions and ferric sulfate are reclaimed from wastewater skimmings, that result from treatment of wastewaters through formation of insoluble heavy metal ferric salts and flotation, by treating the skimmings with aqueous caustic at 150°–225° F. to form a solution of the heavy metal anions and a residual solids fraction, separating the solids and contacting the residual solids with sulfuric acid to produce ferric sulfate.

8 Claims, No Drawings

RECLAMATION OF MOLYBDENUM OR OTHER HEAVY METALS FROM WASTEWATER TREATMENT SKIMMINGS

BACKGROUND OF THE INVENTION

Removal of molybdenum or tungsten or other heavy metal anions from mining wastewater can be effected by precipitation of the heavy metal anions with ferric ion, supplied preferably through addition to the wastewater of ferric sulfate. The heavy metal precipitate, so formed, is separated from the wastewater by electrolytic, dissolved air or dispersed air flotation. Such a removal process is described in copending application Ser. No. 920,259 filed June 29, 1978 in the names of the present inventor and Gopalan Ramadorai and is entitled "Process for Removing Molybdenum and Tungsten from Mining Wastewater," the contents of which application are incorporated by reference herein. Such process is also described generally in the publication entitled "Removal of Heavy Metals from Mining Tailings Wastewater by Electrocoagulation" by the present inventor and A. P. Giannini, presented at the Third Annual Conference, New Advances in Liquid-Solid Separation Technology, Separ/Expo III, at Cherry Hill, N.J., Oct. 12, 1977, the contents of said paper also being incorporated by reference herein.

The process described in the aforementioned disclosures, while teaching the separation of molybdenum or other heavy metals from the wastewater, does not, however, relate to reclamation of the heavy metal anions from the wastewater skimmings produced, or recovery of ferric ion therefrom for recycle to the wastewater treatment process. Since such skimmings contain toxic metals, care must be exercised in their disposal. Hauling such toxic materials to suitable landfill is, of course, expensive.

The present invention is related to a method for treating the wastewater skimmings produced according to the aforedescribed process and to the reclamation of the heavy metal anions present therein, as well as recovery of the ferric content of the wastewater for recycle and re-use in the wastewater treatment process. The reclaimed heavy metal values may be sold for their marketable values, while ferric sulfate produced is recycled to the wastewater treatment process.

BRIEF SUMMARY OF THE INVENTION

Heavy metal anions such as molybdenum and tungsten are reclaimed from wastewater skimmings and ferric sulfate recovered for use in the production of further such skimmings, where the skimmings result from precipitation of heavy metals from wastewater, such as mine tailings, by contact with ferric sulfate to form insoluble ferric salts with subsequent gas flotation, whereby the wastewater skimmings are contacted with aqueous caustic at a temperature of between 150°–225° F. to dissolve the heavy metal anions and form a solution thereof and residual solids, separating the heavy metal anion solution from the residual solids and contacting the residual solids with sulfuric acid to produce ferric sulfate, which ferric sulfate may be used to form additional wastewater skimmings.

DETAILED DESCRIPTION

The present invention is a process for the reclamation of heavy metals from wastewater treatment skimmings where ferric sulfate is used in the treatment of the wastewater to precipitate heavy metal complexes, with the precipitated heavy metal complexes removed from the wastewater by air flotation and skimming of the flotation products, while the ferric ion content of the complexes may be recovered by treatment with sulfuric acid to produce ferric sulfate for use in further treatment of wastewaters.

The wastewater skimmings which are treated according to the present process are those containing insoluble ferric salts of heavy metals such as tungstates, molybdates, chromates or arsenates. Such salts are formed by the reaction of ferric sulfate or other ferric salt with the heavy metals such as tungsten, molybdenum, chromium or arsenic found in the wastewater to form complexes that are subsequently removed from the wastewater as skimmings, such as by flotation with electrolytically generated microbubbles. The wastewater treatment, and production of the skimmings, is described in the hereinbefore identified copending application of Ernest R. Ramirez, the present inventor, and Gopalan Ramadorai, entitled "Process for Removing Molybdenum and Tungsten From Mining Wastewater," Ser. No. 920,259 filed June 29, 1978.

As disclosed therein, the mining wastewater treatment process involves adjusting the pH of the wastewater, containing the heavy metals in their anionic forms, to between 2.0 and 6.0, adding a trivalent metal ion such as ferric ion, by means of addition of ferric sulfate, to form insoluble heteropoly molybdate, tungstate, chromate and arsenate salts. A hydroxyl providing base is then added to the wastewater containing these insoluble complexes and the wastewater subjected to gas flotation, such as by electrolytically producing microbubbles therein, and a flocculant added thereto, such that the heavy metal complexes are buoyed to the surface of the wastewater as a floc and becomes part of the wastewater skimmings upon skimming the floc from the surface of the wastewater.

These wastewater skimmings are then subjected to treatment according to the present process to reclaim the heavy metal content thereof and to recover, for re-use in the wastewater treatment, the ferric ion content thereof.

The wastewater skimmings, containing the ferric complex of the heavy metal anions are contacted with an aqueous caustic solution to leach out the anionic heavy metals present. The skimmings are preferably initially partially dewatered prior to contact with the caustic solution, such as by subjecting the skimmings to a solids separation step which may comprise centrifuging the skimmings or dewatering by use of a plate or frame filter press. Such dewatering, while advantageous in that the volume of the skimmings is reduced, is not, however, necessary to the present invention.

The skimmings are contacted with the hot caustic solution, aqueous sodium hyroxide, at an elevated temperature of between 150°–225° F. This contact, at the elevated temperature, is effected for a period of time sufficient to extract the anionic heavy metals and solubilize the same into an aqueous solution. For example, such contact will form sodium molybdates from the molybdate complexes present in the skimmings and sodium tungstates from the tungstate complexes present therein.

The elevated temperature is important in that use of lower temperatures will not provide satisfactory sodium salt formation with the heavy metal anions. While the time of contact at said temperature may vary dependent upon the particular heavy metal anions present and the concentration of said anions, time periods of contact on the order of fifteen minutes to about one hour have been found to be especially useful. Preferably, the contact is effected by mixing with the skimmings an aqueous sodium hydroxide solution having a concentration of between about 0.5 to 1.0 molar concentration.

After the contact of the skimmings with the caustic solution at the elevated temperature, the heavy metal anions will be solubilized in the aqueous phase, while the ferric content of the skimmings will remain as a residual solids fraction and readily separable by decanting, filtering or other solids-liquid separation means.

In order to recover the ferric ion content for use in treatment of additional mining tailing wastewater, the residual solids fraction, after separation from the aqueous portion containing the heavy metal anions, is contacted with sulfuric acid to produce ferric sulfate. This recovered ferric sulfate has been found to be equally effective in the wastewater treatment as fresh ferric sulfate so that recycling of the ferric ion is possible with the attendant economic benefit. This contact with sulfuric acid is also preferably effected at an elevated temperature, 150°-220° F., for a period of time sufficient to produce the ferric sulfate, for example for a period of thirty to ninety minutes.

As an example of the present process, the following was carried out:

Wastewater skimmings containing insoluble heteropoly ferric molybdate salts were boiled with an aqueous sodium hydroxide solution at a pH of 12.5 for sixty minutes. This mixture was filtered and the aqueous filtrate (Filtrate 1) set aside. To the residue from the filtration step there was added sufficient aqueous sodium hydroxide solution to raise the pH to 12.5 and this mixture was heated and stirred on a magnetic hot plate at a temperature of 180° F. for a thirty minute period. This mixture was then filtered (Filtrate 2). The aqueous filtrates, Filtrate 1 and Filtrate 2, were combined and analysis thereof showed that 83% of the molybdenum present in the wastewater skimming was recovered in the combined filtrates which contained no ferric ion content.

The residue from the second filtration step was treated with 1:2 $H_2SO_4$ and stirred for a thirty minute period at boiling temperature. The mixture was then filtered. The filtrate (Filtrate 3) was found to contain 88% of the ferric ion present in the original wastewater skimmings as ferric sulfate, and an additional 16.6% of the molybdenum. The residue from the filtration of the acid treated solution was found to contain only 12.3% of the ferric ion and 0.5% of the molybdenum present in the wastewater skimmings and was discarded.

The results show that over 80% of the molybdenum can be recovered as a sodium molybdate solution, while close to 90% of the iron is recovered.

Ferric sulfate obtained by the process above described was used to treat a new batch of molybdenum tailings wastewater according to the aforementioned flotation process, and it was found that the recycled ferric sulfate is comparable to fresh ferric sulfate in the wastewater treatment.

I claim:

1. A process for the reclamation of heavy metal anions selected from the group consisting of tungsten, molybdenum, chromium, and arsenic anions, and ferric sulfate from wastewater skimmings resulting from the precipitation of said heavy metal anions from wastewater, by contact with ferric sulfate and formation of insoluble ferric heteropoly molybdate, tungstate, chromate and arsenate salts, followed by gas flotation and separation of said wastewater skimmings comprising:
   (a) contacting said wastewater skimmings with an aqueous caustic at a temperature of 150°-225° F. for a period of time to form a solution of said heavy metal anions and a residual solids fraction which includes the ferric content of the skimmings;
   (b) separating the solution of heavy metal anions so produced from said residual solids; and
   (c) contacting said residual solids with sulfuric acid to produce ferric sulfate.

2. The process for the reclamation of heavy metal anions and ferric sulfate from wastewater skimmings as defined in claim 1 wherein a portion of the water contained within the wastewater skimmings is removed therefrom prior to contact of the skimmings with the aqueous caustic.

3. The process for the reclamation of heavy metal anions and ferric sulfate from wastewater skimmings as defined in claim 1 wherein the ferric sulfate produced by said contact of residual solids with sulfuric acid is recycled for production of additional wastewater skimmings.

4. The process for the reclamation of heavy metal anions and ferric sulfate from wastewater skimmings as defined in claim 1 wherein said aqueous caustic is in the concentration range of 0.5 molar to 1 molar.

5. The process for the reclamation of heavy metal anions and ferric sulfate from wastewater skimmings as defined in claim 1 wherein said aqueous caustic is contacted with the wastewater skimmings for a period of thirty to sixty minutes.

6. The process for the reclamation of heavy metal anions and ferric sulfate from wastewater skimmings as defined in claim 1 wherein said sulfuric acid is contacted with the residual solids at a temperature of between 150°-220° F.

7. The process for the reclamation of heavy metal anions and ferric sulfate from wastewater skimmings as defined in claim 6 wherein said sulfuric acid is at a concentration of about 50 percent by weight.

8. A process for the reclamation of molybdenum anions and ferric sulfate from wastewater skimmings resulting from the precipitation of said molybdenum from wastewater, by contact with ferric sulfate and formation of insoluble ferric heteropoly molybdate salts followed by gas flotation and separation of said wastewater skimmings comprising:
   (a) dewatering said wastewater skimmings to remove a portion of water therefrom;
   (b) contacting said dewatered wastewater skimmings with an aqueous caustic at a temperature of 150°-225° F. for a period of fifteen to sixty minutes to form a solution of said molybdenum anions and a residual solids fraction;
   (c) separating the solution of molybdenum anions so produced from said residual solids by filtration; and
   (d) contacting said residual solids with sulfuric acid at a temperature of 180°-220° F. for a period of thirty to ninety minutes to produce ferric sulfate.

* * * * *